US009613129B2

United States Patent
Atkins et al.

(10) Patent No.: US 9,613,129 B2
(45) Date of Patent: *Apr. 4, 2017

(54) LOCALIZED DATA AFFINITY SYSTEM AND HYBRID METHOD

(71) Applicant: United States Postal Service, Washington, DC (US)

(72) Inventors: C. Scot Atkins, Chantilly, VA (US); Joseph Conway, Annandale, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/555,443

(22) Filed: Nov. 26, 2014

(65) Prior Publication Data

US 2015/0088893 A1    Mar. 26, 2015

Related U.S. Application Data

(63) Continuation of application No. 13/083,396, filed on Apr. 8, 2011, now Pat. No. 8,935,248.

(60) Provisional application No. 61/395,704, filed on May 17, 2010.

(51) Int. Cl.
*G06F 9/50* (2006.01)
*G06F 17/30* (2006.01)

(52) U.S. Cl.
CPC ...... *G06F 17/30598* (2013.01); *G06F 9/5033* (2013.01); *G06F 17/3048* (2013.01); *G06F 17/30445* (2013.01); *G06F 17/30463* (2013.01); *G06F 2209/5012* (2013.01)

(58) Field of Classification Search
CPC ......... G06F 17/30445; G06F 17/30463; G06F 17/30598; G06F 9/5033; G06F 17/3048; G06F 2209/5012
See application file for complete search history.

(56) References Cited

U.S. PATENT DOCUMENTS

| | | | |
|---|---|---|---|
| 5,551,027 A | 8/1996 | Choy et al. | |
| 5,721,909 A | 2/1998 | Oulid-Aissa et al. | |
| 5,842,207 A | 11/1998 | Fujiwara et al. | |

(Continued)

FOREIGN PATENT DOCUMENTS

| | | |
|---|---|---|
| JP | 06-314299 | 11/1994 |
| JP | 2003-6021 | 1/2003 |

OTHER PUBLICATIONS

International Search Report dated Aug. 25, 2011, for PCT/US2011/36683.

(Continued)

*Primary Examiner* — Jorge A Casanova
(74) *Attorney, Agent, or Firm* — Knobbe, Martens, Olson & Bear LLP

(57) ABSTRACT

A method, system, and computer program for processing records is disclosed. The records are associated with record sets, based on a record number contained in the record. Record sets are associated with physically separate processor sets, which include one or more processors. Records are electronically routed to associated processor sets for processing, based on the record set associated with the record. Records are processed on processors in the processor sets. Furthermore, various localized affinities can be established. Process affinity can link server processes with processor sets. Cache affinity can link database caches with processor sets. Data affinity can link incoming data to processor sets.

27 Claims, 5 Drawing Sheets

(56) References Cited

U.S. PATENT DOCUMENTS

| | | |
|---|---|---|
| 6,658,522 B1 | 12/2003 | Martin et al. |
| 7,661,146 B2 | 2/2010 | Karimzadeh et al. |
| 7,779,045 B2 | 8/2010 | Mohamed et al. |
| 7,818,349 B2 | 10/2010 | Frost |
| 8,271,545 B2 | 9/2012 | Butcher et al. |
| 2001/0052024 A1 | 12/2001 | Devarakonda et al. |
| 2002/0049903 A1 | 4/2002 | Ussery et al. |
| 2004/0181524 A1 | 9/2004 | Jardin |
| 2004/0215626 A1 | 10/2004 | Colossi et al. |
| 2005/0165906 A1 | 7/2005 | Deo et al. |
| 2006/0190243 A1 | 8/2006 | Barkai et al. |
| 2008/0071755 A1 | 3/2008 | Barsness et al. |
| 2009/0132469 A1 | 5/2009 | White et al. |
| 2009/0296711 A1 | 12/2009 | Kennedy et al. |

OTHER PUBLICATIONS

International Preliminary Report on Patentability dated May 15, 2012, for PCT/US2011/36683.
Office Action dated Aug. 4, 2015 in corresponding Japanese Patent Application No. 2013-511265.
Extended European Search Report dated Sep. 28, 2015 for European Patent Application No. EP 11 784 046.2 which shares priority of U.S. Appl. No. 61/395,704, filed May 17, 2010 with captioned U.S. Appl. No. 14/555,443.
Office Action dated Apr. 5, 2016 in Japanese Application No. 2013-511265 with English Translation.

LOCALIZED DATA AFFINITY SYSTEM AND HYBRID METHOD

CLAIM OF PRIORITY

This application is a continuation of U.S. application Ser. No. 13/083,396, filed Apr. 8, 2011, which claims the benefit of U.S. Provisional Patent Application No. 61/395,704, filed May 17, 2010, each of which is incorporated in its entirety by reference herein.

BACKGROUND

Field

The disclosure generally relates to multi-processor computer systems, and more specifically, to methods and systems for routing and processing data in multi-processor computer systems.

Description of the Related Art

Multi-processor computer systems allow concurrent processing of multiple parallel processes. Some applications can be parallelized efficiently among the processors in a multi-processor computer system. For instance, some applications can be parallelized by dividing different tasks into sub-processes called threads. Threads may perform operations on different data at the same time. However, one thread may sometimes need to operate on an intermediary or final output of another thread. When two threads have to wait often for the other to share information, they can be said to have high data dependency. Conversely, when threads rarely need to wait for information from other threads, they can be said to have low data dependency. Applications that have low data dependency between threads are often desirable because they can process more data in parallel for longer periods of time. Nevertheless, a great number of applications have high data dependency between threads. This can occur, for example, when each piece of data must be compared to each other piece of data in a dataset. Thus, when data dependency is high, a significant portion of the dataset may need to be accessible in memory. Accordingly, for processing operations with high data dependency, the process of transferring data between threads can significantly delay computation. This delay is often exacerbated when each threads is running on physically separated hardware nodes, as is common in multi-processor computer systems. In such systems, inter-node input/output (IO) operations can often constitute a significant bottleneck to the data processing rate of the system, also known as throughput. Memory hops can range from as little as 1-2 nanosecond using non-uniform memory architecture (NUMA) in local CPU/memory sets to multiple milliseconds when accessing a storage area network (SAN) over various network fabrics. Because processors are often idle while they wait for data to be delivered, throughput bottlenecks can represent a significant waste of time, energy, and money.

FIG. 1 shows a multi-processor system 110 including multiple nodes 120 connected by a network 130 to each other and to a shared memory 140. Nodes 120 can be logically discrete processing components characterized by separated memory systems. In some implementations, nodes 120 can be physically discrete systems, such as servers that have local memory storage and processing capabilities. In the illustrated system 110, there are N nodes 120. Although only three nodes are shown, there may be any number of nodes 120. Each node 120 includes at least one processor 150 and a cache 160. Although only one processor 150 is shown, each node 120 can include any number of processors 150. Similarly, the processor 150 can include any number of processor cores. Processor cores represent the parts of the processor 150 that can independently read and execute instructions. Thus, in one example, two processor cores can simultaneously run two processing threads. In some implementations, node 120 can include a total of four processor cores. In some implementations, node 120 can include a total of eight or more processor cores.

Multi-processor systems such as multi-processor system 110 are typically used in operations that process vast amounts of data. For example, the US Postal Service, with a peak physical mail volume approaching more than 212 billion pieces annually in 2007, is one of the world's largest users of high-volume data processing. Each physical mail piece is handled multiple times on automated equipment, and each automated event produces data scan records. Even when physical mail volumes decrease, additional tracking and performance metrics have increased the number of mail tracking scans, per physical mail piece. Thus, daily mail piece scan volumes can top more than 4 billion records. Each of these records is processed by a multi-processor system such as system 110. When mail records are processed, the system detects duplicate records by comparison to billions of previous records up to many months old. The system is also responsible for finding and removing the oldest mail records when storage capacity is reached, querying mail records for report generation, and other similar tasks. This example demonstrates the magnitude of the problem of efficiently processing data records in a system such as the multi-processor system 110.

Processing in a multi-processor system can include a row insertion operation. Conventionally, the row insertion may have been performed as follows: Incoming records would be routed in parallel to nodes 120 or specific processors 150 based on a criterion such as, for example, load-balancing. For example, under one load-balancing method, the incoming records would be routed to a processor 150 chosen from a set of available processors on a round-robin basis, without considering such factors as the location of related records. Additionally, database insertion processes would be scheduled on the processors 150. Upon receiving an incoming record, a processor 150 would then search for the record in the database. The search might require accessing data not stored in the local cache 160. Such a search might include a storage area network (SAN). Accordingly, the processor 150 might locate the requisite data on a remote node and transfer the data over the network 130 to the local node for comparison. In some implementations, the processor 150 may compare the incoming record with every record in the database. Thus, the processor 150 would transfer a significant amount of data over the network 130 to the local node. If no matches were found, the processor 150 would insert the record into the database.

At the same time, however, another processor 150 on another node 120 would be concurrently performing the same tasks on a different record. Thus, it is possible that two processors 150, operating on two matching records, could simultaneously attempt insertion into the same memory location. This can be referred to as a race condition, and can occur as follows: First, a first processor would determine that a first record has no match. Next, a second processor would determine that a second record has no match. Note that although the first and second records may or may not match, neither has been successfully inserted into the database yet. Subsequently, the first processor inserts the first record into the database. Finally, the second processor, having already determined that there is no record match, inserts the second record into the database. In order to ensure a race condition does not cause identical records to be inserted into the database, each processor 150 can obtain exclusive access to the insertion memory location, via a mechanism such as a lock. A number of different locking mechanisms are known in the art. Establishing and relinquishing memory locks can themselves require data transfers over the network 130. Thus, as memory blocks are locked, unlocked, and transferred back and forth over the relatively slow network 130, a significant amount of processing time can be wasted.

The multi-processor system 110 can incorporate a number of techniques to improve efficiency and cost-effectiveness. For example, the shared memory 140 can be organized hierarchically. Hierarchical memory organization can allow the system 110 to utilize a mix of memory media with different performance and cost characteristics. Thus, the system 110 can simultaneously exploit small amounts of faster, expensive memory for high-priority tasks and large amounts of slower, cheaper memory for other tasks. Accordingly, the shared memory 140 can be physically implemented with several different storage media, which may be spread out in multiple locations. For example, the processors 150 might store infrequently used data on a relatively cheap and slow disk drive in a storage area network (SAN, not shown). At the same time, the shared memory 140 can also be partially distributed amongst the nodes 120. The caches 160 can include local copies (caches) of data in the shared memory 140. The processor 150 can locally cache the data in a relatively fast and expensive dynamic random access memory (DRAM, not shown). The DRAM can be shared with other processors on a processing module. Typically, when the processor 150 requires more data, it will first look in the local cache 160, which usually has a relatively low latency. For example DRAM latency is typically measured in nanoseconds. If the data sought is not located in the local cache, a memory manager might have to retrieve the data from the SAN over the network 130. Because the SAN might be located far away, the memory manager might have to request the data over a relatively slow interconnect, such as Ethernet. SAN requests have much higher latency, typically measure in milliseconds. The relative speed of the interconnect, combined with additional latency of slower storage media, often results in significant performance degradation when data is not found in the local cache (a "cache miss"). Thus, most systems attempt to keep information that is accessed frequently in the local cache.

When a process runs on a multi-processor computer system such as system 110, it is typically scheduled to run on the next available node 120. However, the next available node 120 may not be the same node on which the process was last run. Under a hierarchical memory model as described above, the data the process has recently accessed will likely reside in a cache on the node on which the process was last run. This tendency can be called cache persistence. In order to take advantage of cache persistence in multi-processor environments, processes can be assigned an affinity to one or more processors. Processes given such affinity are preferentially scheduled to run on certain processors. Thus, affinitized processes are more likely to run on a processor that already has important process information in its local cache. However, affinity does not eliminate the problem of cache misses, particularly when applications have high data dependency between threads. Cache misses can persist in systems where the shared memory 140 is partially distributed amongst the nodes 120. One example of such as system is called a cache coherent system, which maintains consistency between the shared memory 140 that is distributed amongst the nodes 120. In a cache coherent system, for example, an affinitized process may be programmed to compare incoming data to data previously processed on another node 120. The affinitized process may also be programmed to modify that data. In order to maintain memory consistency, the data is typically transferred between nodes 120. Thus, even though much of the data to be processed may be contained in the local cache 160, the data transfer between nodes 120 due to high data dependency can still represent a significant throughput bottleneck.

Typically, systems such as the USPS mail system described above are already using the fastest hardware practicable. Thus, it is not feasible to clear the throughput bottleneck with, for example, a faster network 130. Similarly, because the bottleneck occurs between nodes 120, adding additional nodes will not provide the desired increase in throughput. At the same time, it is not typically a viable option to decrease the rate of incoming data. For example, it is probably not acceptable for the Post Office to delay the mail, or associated reporting, to accommodate computer bottlenecks. Within such systems, the locality of memory is dominated by its "electron distance," or the distance an electron would have to travel over an electrical path in order to reach the memory. For example, a processor 150 accessing a local cache 160 could have an "electron distance" on the order of millimeters. On the other hand, a processor 150 accessing memory located on another node 120 or over a SAN could have an "electron distance" on the order of meters. Accordingly, it is desirable to resolve the bottleneck at a system-architecture level. In attempting to solve this problem, others have attributed a throughput limit to the need for remote data access. However, systems and methods described herein are capable of addressing this remote data access bottleneck in an unanticipated manner.

SUMMARY

The system, method, and devices of the development each have several aspects, no single one of which is solely responsible for its desirable attributes. Without limiting the scope of this disclosure, its more prominent features will now be discussed briefly. After considering this discussion, and particularly after reading the section entitled "Detailed Description" one will understand how the features of this disclosure provide advantages over other methods and/or devices.

In accordance with one aspect, a method of processing records in a database is provided. The records are processed on a plurality of processors, which are grouped into a plurality of processor sets. The method comprises associating each record with a record set of a plurality of record sets, associating each record set with a processor set, routing the records to processor sets based on the associated record set, and processing the records with the processor sets.

In accordance with another aspect, an apparatus is provided. The apparatus comprises a plurality of processors, which are grouped into a plurality of processor sets. The processor sets are configured to process records in a database. The apparatus is configured to associate each record with a record set of a plurality of record sets, associate each record set with a processor set, route the records to processor sets based on the associated record set, and process the records.

In accordance with another aspect, a computer-readable non-transitory storage medium is provided. The computer-readable non-transitory storage medium comprises code capable of causing a computer to associate each record in a database with a record set of a plurality of record sets, associate each record set with a processor set, route the records to processor sets based on the associated record set, and process the records.

In accordance with another aspect, a method of inserting a record into a database in a multiprocessor environment is provided. The method comprises receiving, at a routing node, a record. The method further comprises associating, at the routing node, the record with a record set of a plurality of record sets. The method further comprises routing the record to a processor set of a plurality of processor sets based on the associated record set. The method further comprises searching, at the processor set, a part of the database for a matching record. The part of the database is associated with the processor set. The method further comprises inserting the record into the part of the database when the record is not found in the part of the database.

In accordance with another aspect, an apparatus is provided. The apparatus comprises a routing node and a plurality of processors grouped into a plurality of processor sets. The processor sets are configured to process records in a database. The apparatus is configured to receive, at a routing node, a record. The apparatus is further configured to associate, at the routing node, the record with a record set of a plurality of record sets. The apparatus is further configured to route the record to a processor set of the plurality of processor sets based on the associated record set. The apparatus is further configured to search, at the processor set, a part of the database for a matching record, the part of the database being associated with the processor set. The apparatus is further configured to insert, at the processor set, the record into the part of the database when the record is not found in the part of the database.

In accordance with another aspect, a computer-readable non-transitory storage medium is provided. The computer-readable non-transitory storage medium comprises code capable of causing a computer to receive, at a routing node, a record. The code is further capable of causing a computer to associate, at the routing node, the record with a record set of a plurality of record sets. The code is further capable of causing a computer to route the record to a processor set of a plurality of processor sets based on the associated record set. The code is further capable of causing a computer to search, at the processor set, a part of the database for a matching record, the part of the database being associated with the processor set. The code is further capable of causing a computer to insert, at the processor set, the record into the part of the database when the record is not found in the part of the database.

In accordance with one aspect, a system for processing records in a database is provided. The records are processed on a plurality of processors, which are grouped into a plurality of processor sets. The system comprises means for associating each record with a record set of a plurality of record sets, means for associating each record set with a processor set, means for routing the records to processor sets based on the associated record set, and means for processing the records with the processor sets.

DETAILED DESCRIPTION

Figure 1:
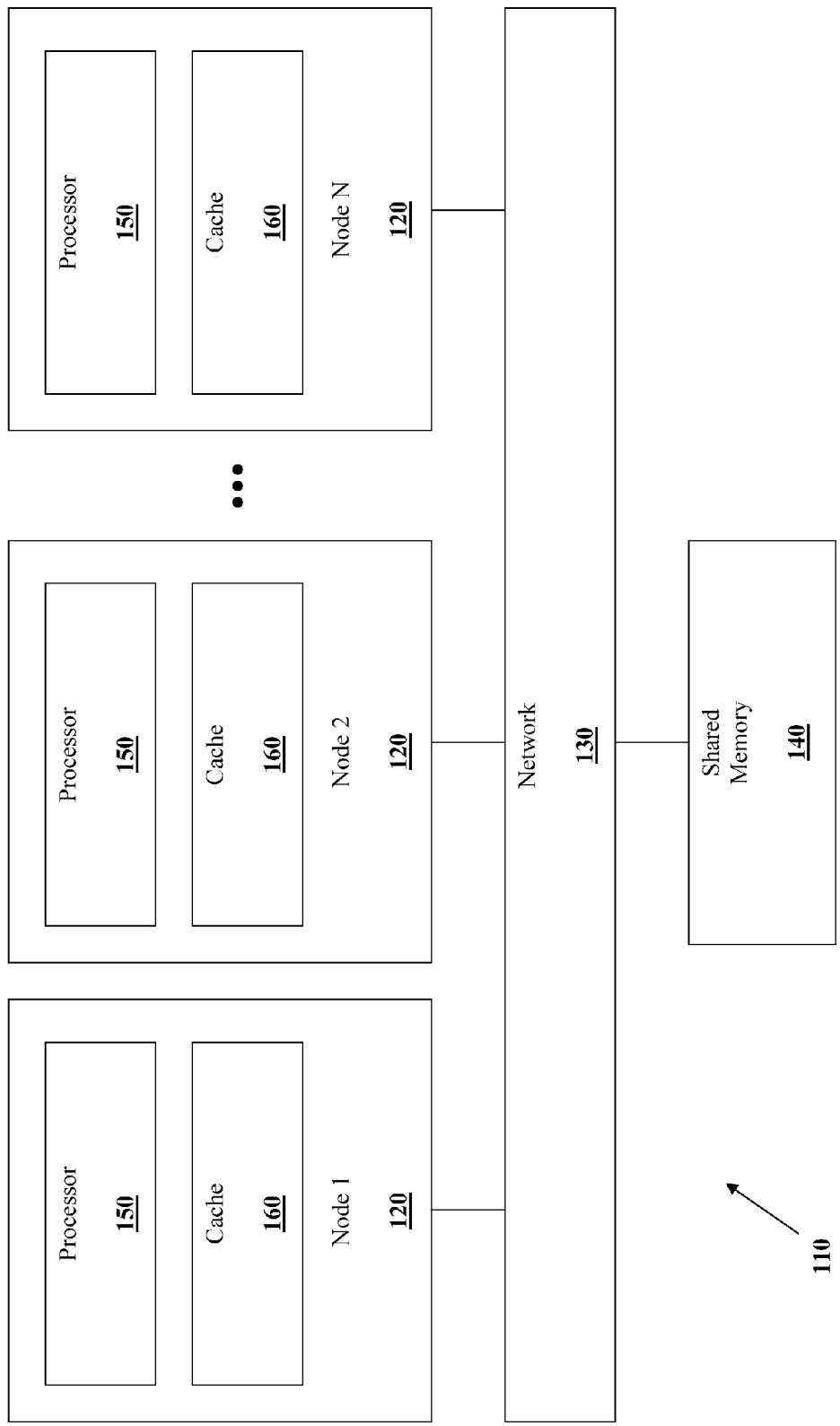
FIG. 1 is a block diagram of a multi-processor computer system.

Referring to FIG. 1, in one embodiment, the multi-processor computer system 110, upon which features of the disclosure are implemented, includes a SGI® Altix® 4700 (Silicon Graphics, Inc., 46600 Landing Parkway, Fremont, Calif. 94538) modular blade platform running an Oracle® TimesTen (500 Oracle Parkway, Redwood Shores, Calif. 94065) in-memory database. In another embodiment, the multi-processor computer system 110, upon which features of the disclosure are implemented, includes a SGI® Ultra Violet® (Silicon Graphics, Inc., 46600 Landing Parkway, Fremont, Calif. 94538). The platform may include any number of nodes 120. Each node 120 may include any number of processors 150. In an embodiment, there are between about 1 and about 32 processors 150 per node 120. In another embodiment, there are between about 4 and about 8 processors 150 per node 120, and more particularly, about 4 processors 150 per node 120. Although various embodiments are described herein with reference to particular datasets, applications, and hardware, one skilled in the art would realize that the present disclosure is applicable to different configurations.

The multi-processor computer system 110 can be configured to read records and insert those records into a database configured into tables having rows and columns. In one embodiment, the multi-processor computer system 110 is configured to perform a row insertion by reading an incoming record, searching for the record in the database, and inserting the record into the database if the record is not found in the database. In another embodiment, the multi-processor computer system 110 is further configured to search the database for records older than an aging period, and to remove those records. In various embodiments, the aging period is between about 5 days and about 14 days, more particularly between about 5 days and 7 days, and even more particularly about 5 days. In an alternative embodiment, the multi-processor computer system 110 is configured to remove old records in order to maintain a limit on the number of records in the database. In yet another embodiment, the multi-processor computer system 110 is configured to remove old records in order to maintain a limit on the size of the database. For example, an in-memory data base (IMDB) may include 7.5 TB of records, representing between 180 days and 6 years worth of records.

Figure 2:
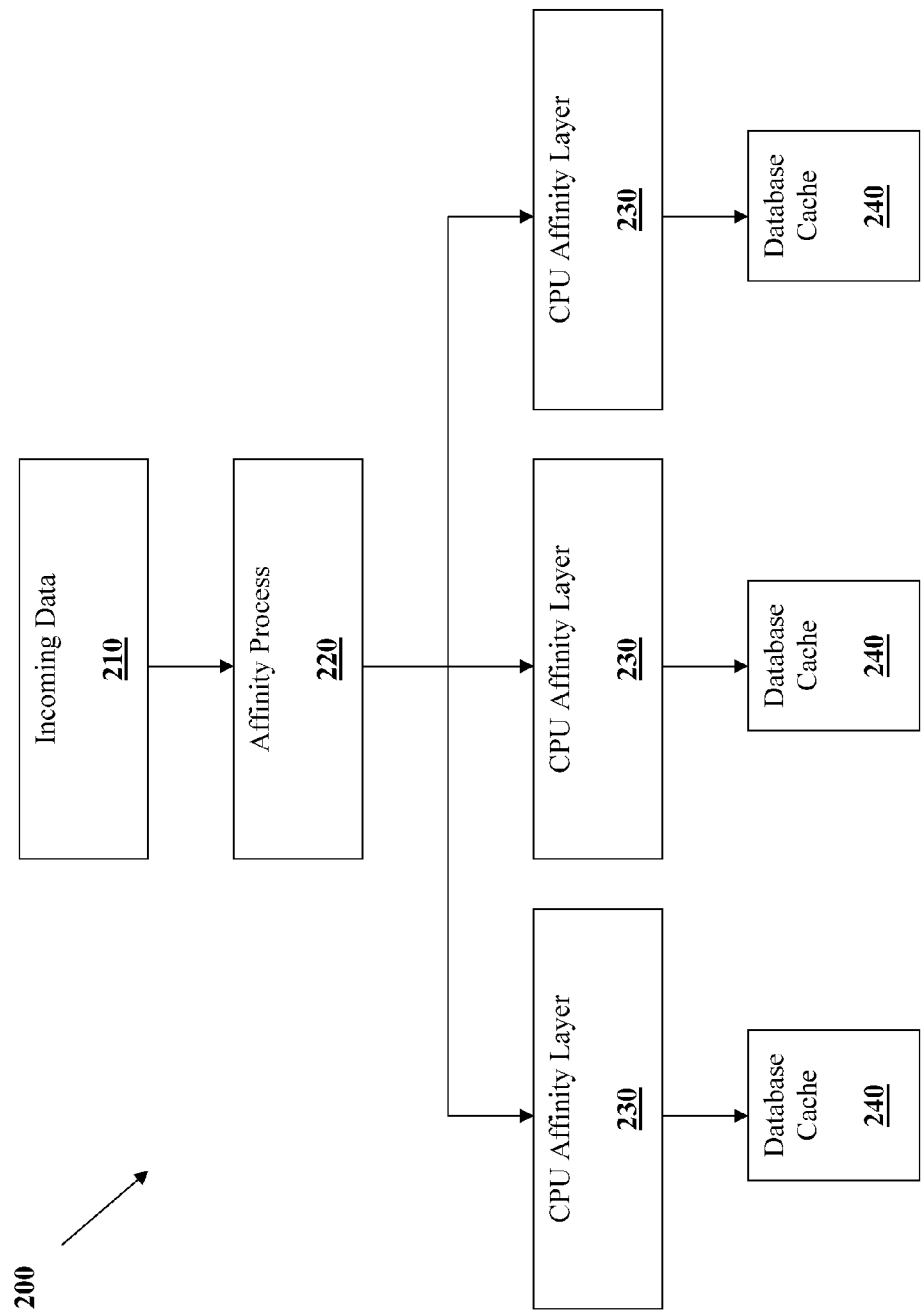
FIG. 2 is a block diagram of a multi-processor computer system configured to process data according to an embodiment.

Turning to FIG. 2, a record processing system 200 is shown. Record processing system 200 can be configured to reduce the number of high-latency network operations needed when executing a program such as, for example, the row insertion process described above with respect to FIG. 1. Record processing system 200 may be implemented with a multi-processor computing system such as, for example, the multi-processor computing system 110 shown in FIG. 1.

In the record processing system 200, incoming data 210 is parsed by an affinity process 220 in order to determine it's processor affinity. The affinity process 220 serves to assign the incoming data 210 to a CPU affinity layer 230. The CPU affinity layers 230 may correspond to nodes 120 or processors 150, as described above with respect to FIG. 1. The affinity process 220 may assign the incoming data 210 to a CPU affinity layer 230 based on a property of the data such as, for example, a record number. In one embodiment, incoming data 210 includes a record number and the affinity process 220 assigns the incoming data 210 to a CPU affinity layer 230 by taking the record number modulo N, the number of CPU affinity layers 230 in the system. In another embodiment, the affinity process 220 assigns the incoming data 210 based on a hash of the data by using, for example, the secure hash algorithm (SHA). A database cache 240 is associated with each CPU affinity layer 230.

The criteria by which the affinity process 220 assigns incoming data 210 to a CPU affinity layer 230 can be chosen such that the processing of incoming data 210 assigned to a CPU affinity layer 230 is only dependent on other data assigned to the same CPU affinity layer 230. In other words, the incoming data 210 assigned to a given CPU affinity layer 230 can be said to be locally dependent. Thus, a CPU affinity layer 230 that is processing incoming data 210 is more likely to find other data needed in a local cache. For example, in one embodiment, the application can be the row insertion process described above. In that embodiment, the database can be divided into N parts, where N is the number of CPU affinity layers 230. Each database part is associated with a CPU affinity layer 230. Thus, the database cache 240 need only contain records from the database part associated with the corresponding CPU affinity layer 230. In one embodiment, the database cache 240 is large enough to completely cache the associated database part. Thus, in embodiments where the database cache 240 is at least as large as the associated database part, the CPU affinity layer 230 can have relatively low-latency access to all the requisite data.

Furthermore, latency can be reduced by considering the "electron distance" between the CPUs in the affinity layer 230 and the database cache 240 during the affinitization process. For example, hops from CPU to "local" memory DIMMs (on the same node), in an SGI Altix 4700 typically take 10 ns. Hops between blades in the same rack unit typically take 22 ns, and hops between blades in different rack units typically take between 33 ns and 256 ns. Hops across NUMA to additional racks are typically over 256 ns and can increase exponentially as memory increases. The affinity process 220 can take this "electron distance" into account to increase the likelihood that incoming data 210 is placed in a memory location with a low "electron distance" to the CPU that will process it.

Incoming data 210 records can be assigned to a database in a deterministic manner as described above. Because the CPU affinity layer 230 only needs to search the database part stored in the local database cache 240, there is no need to access remote memory over the network. Therefore, in this example, incoming data 210 records are only locally dependent, in that any two records that are accessed for a database search are assigned to the same CPU affinity layer 230. Even though the CPU affinity layer 230 may still need to perform memory locking, locking of local memory is likely to be much faster than the locking remote memory because no network transfers are involved. The manner in which record processing system 200 can be configured is shown in FIG. 3.

Figure 3:
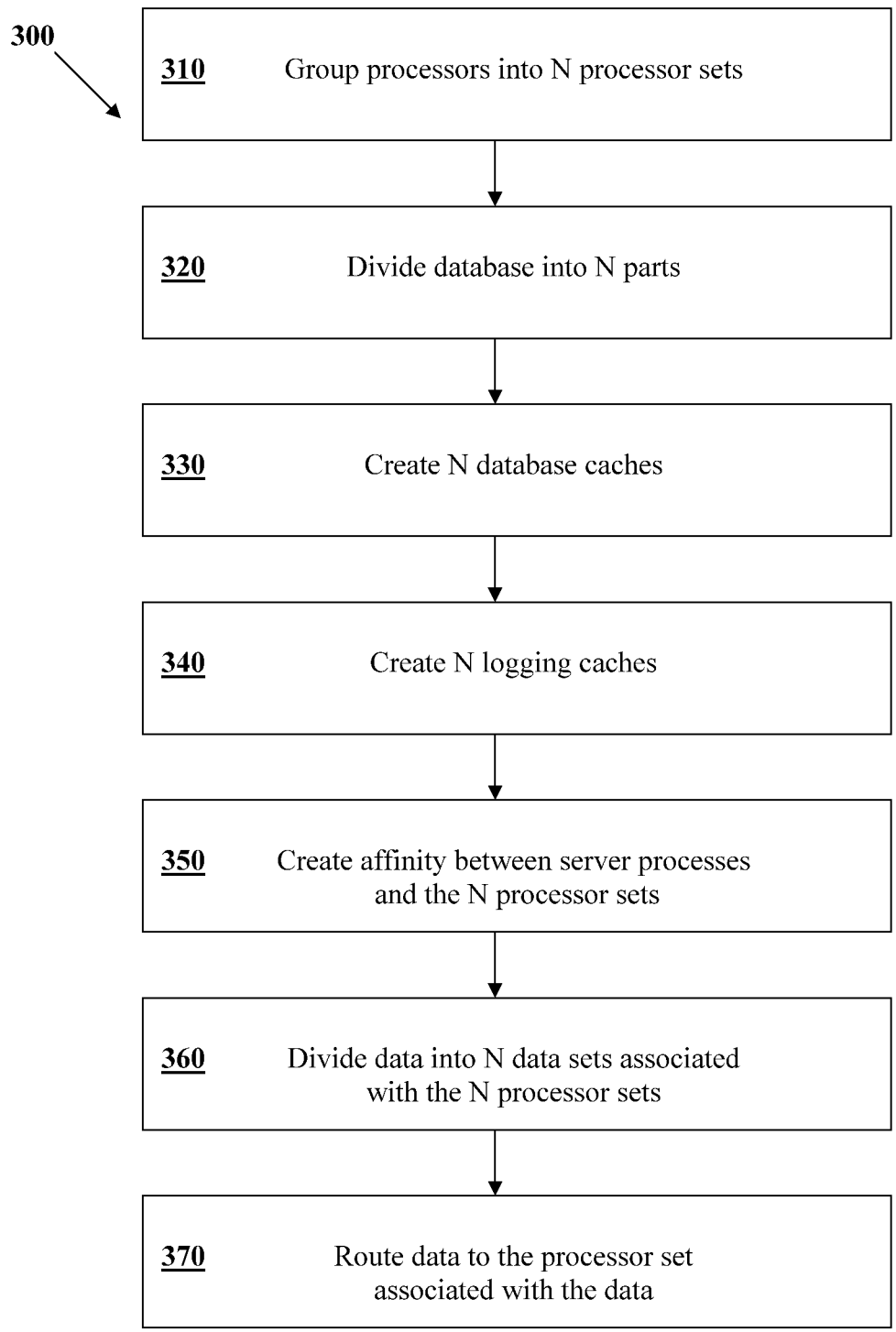
FIG. 3 is a flow chart of a method for processing data according to another embodiment.

FIG. 3 illustrates a method 300, according to one embodiment, of processing incoming data such as, for example incoming data 210 discussed above with respect to FIG. 2. Method 300 can be implemented, for example, on the multi-processor computer system 110, as discussed above with respect to FIG. 1. First, with respect to block 310, processors in the system are grouped into N processor sets. Thus, each processor set includes one ore more processors.

Each processor set can correspond to a node such as, for example, the node 120 described above with respect to FIG. 1. In one embodiment, each processor set corresponds to a CPU affinity layer 230 described above with respect to FIG. 2.

Continuing to block 320, the database is divided into N parts. Each part can be a sub-database. According to one embodiment, each part is a table in a single database. In another embodiment, each sub-database can be configured to hold data that is, at most, locally dependent during processing. For example, in an embodiment where the processing function is row insertion, all data with an even record number can be assigned to a single database. In one embodiment, N is between about 2 and about 16. In another embodiment, N is between about 4 and 8, and more particularly, about 6.

Moving to block 330, N database caches are created. Each database cache is associated with a processor set. In one embodiment, the database caches correspond to database caches 240 described above with respect to FIG. 2. Advantageously, in one embodiment, the database cache is large enough to store an entire sub-database. Therefore, the associated processor set would rarely, if ever, experience a cache miss. The database caches can be configured such that they reside only in memory local to the processor set with which they are associated. As described above, locality can be determined with respect to the "electron distance" between a memory and a processor. Accordingly, the database caches can be assigned to physical memory locations with short "electron distance" to an affinitized processor.

Similarly, with respect to block 340, N logging caches are created. Like the database caches described above, each logging cache is associated with a processor set. In one embodiment, a single processor in the processor set can be assigned to perform database logging to the logging cache. In that embodiment, because logging occurs locally, there is less chance that a local process would stall while waiting for a logging cache miss. The logging caches can be configured such that they reside only in memory local to the processor set with which they are associated. As described above, locality can be determined with respect to the "electron distance" between a memory and a processor. Accordingly, the database caches can be assigned to physical memory locations with short "electron distance" to an affinitized processor.

Subsequently, with respect to block 350, a processor affinity is created by associating M server processes with the N processor sets. In various embodiments, M can be equal to N, a multiple of N, or some other relationship. As described above, processes given such affinity can be preferentially scheduled to run on certain processors. In one embodiment, the server processes are configured to perform database row insertions with incoming data. Because the server processes are preferentially scheduled to run on the associated processor sets, there is a greater chance that data related to that process (such as the process context) will be preserved between the times that the process runs. In one embodiment, each server process always runs on the same processor set. Thus, because the process always runs on the same processor set, it will always use the same database cache and/or logging cache. This configuration can further reduce the likelihood of a cache miss.

Proceeding to block 360, data is divided into N data sets. In one embodiment, data is incoming data 210, described above with respect to FIG. 2. Similarly, as discussed above with respect to affinity process 220 in FIG. 2, data can be divided into sets based on, for example, the modulo of a record number contained in the data. For example, in a multi-processor computing system with two processor sets, data containing even record numbers can be assigned to a first data set, and data containing odd record numbers can assigned to a second data set. Each data set is associated with a processor set. As discussed, data can be divided into data sets such that there is little or no dependency between data sets with respect to a target application.

Then, with respect to block 370, the data is routed to the associated processor set. For example, in an embodiment including a multi-processor computing system with two processor sets, data containing even record numbers can be routed to a first processor set, and data containing odd record numbers can routed to a second processor set. In this way, a data affinity is created. Furthermore, through the server process and cache affinity described above, each processor set is also associated with at least one server process and cache. Thus, in embodiments where server processes are configured to perform database row insertions, server processes are likely to be able to restore context from a local cache and perform a row insertion on the relevant sub-database using only the local database cache. Accordingly, the likelihood of a cache miss is reduced, and data processing throughput is increased.

Figure 4:
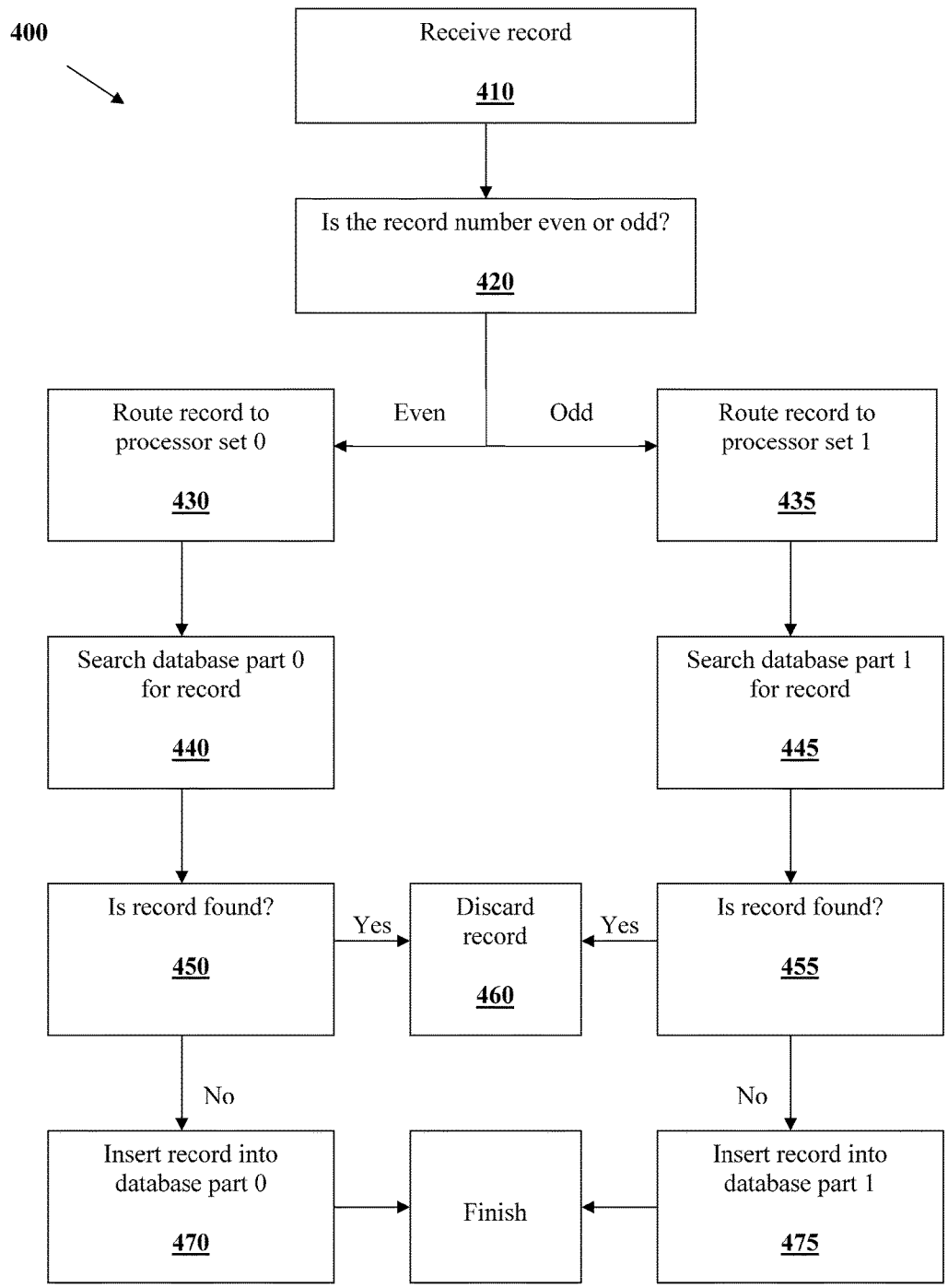
FIG. 4 is a flow chart of a method for inserting records into a database according to another embodiment.

FIG. 4 is a flow chart of a method 400 for inserting records into a database according to another embodiment. The illustrated flow chart assumes a processing environment that has been established with N=2, as discussed above with respect to FIG. 3. In other words, available processors have been divided into two processor sets: processor set 0, and processor set 1. Likewise, the record database has been divided into two parts: database part 0, and database part 1. Furthermore, there are two database caches and two logging caches. In other embodiments, N can be any number such as, for example, 3, 4, 6, 8, 16, etc.

Starting with block 410, a routing unit receives a record. In some embodiments, the record can be a permit indicia or information based indicia (IBI) used for authenticating postage. The routing unit can be a single processor assigned to handle routing, a routing process that is scheduled to run on any available processor based upon demand, or any other configuration. The record has a distinguishable feature that allows it to be separated into two or more sets. In the illustrated embodiment, the record includes a number that is either even or odd.

Continuing to block 420, the record is associated with one of two data sets: even or odd. If the record number is even, it is assigned to the even data set, and if the record number is odd, it is assigned to the odd data set. As discussed above, a skilled artisan will recognize that there are many ways to assign the record to a record set. The even and odd data sets in described herein and illustrated in FIG. 3 are examples chosen for simplicity. Each data set is associated with a processor set. Specifically, the even data set is associated with processor set 0, and the odd data set is associated with processor set 1.

Moving to blocks 430 and 435, the record is routed by the routing unit to the processor set associated with its data set. Specifically, if the record is even, the record is routed to processor set 0 at block 430. Alternatively, if the record is odd, the record is routed to processor set 1 at block 435. The record may be routed to the processor set by sending the record to a process thread that is affinitized to the one or more processors of that processor set. Thus, while the process may be scheduled on any processor in the processor set, the record can be guaranteed to be processed by a specific associated processor set.

Subsequently, at blocks 440 and 445, the associated processor set assigned to process the record searches the associated database part for a matching record. Specifically, if the record is even, a process running on processor set 0 searches database part 0 for a matching record at block 440. Alternatively, if the record is odd, a process running on processor set 1 searches database part 1 for a matching record at block 445. In one embodiment, searching the database part for a matching record can include reading each row in the database part and comparing the record number in that row with the incoming record. In other embodiments, searching the database part for a matching record can include another known search technique such as, for example, a binary search. Because each record is associated with a record set that is routed to an associated processor set for insertion into an associated database part, the search algorithm can assume that only even records exist in database part 0 and that only odd records exist in database part 1. Therefore, the search algorithm running on processor set 0 need only search database part 0 and does not need to access database part 1 (and vice versa). Accordingly, the methods described herein allow a processor set to effectively search all database parts located across all processor sets by accessing only local memory.

Next, at blocks 450 and 455, appropriate action is taken depending on whether the record already exists in the associated database part. If it does, the record is discarded at block 460. In some embodiments, the record can be flagged for further review. For instance, in embodiments where records represent postage authorization that is expected to be unique, the process can send a network message to the originating computer indicating unpaid postage. If, however, the record is not found in the associated database part, the record is inserted into the associated database at blocks 470 and 475. Specifically, if the record is even, it is inserted into database part 0 at block 470. Alternatively, if the record is odd, it is inserted into database part 1 at block 475. Because many databases are organized into rows and columns, the insertion of the record into the associated database part can be called a row insertion. Row insertions can be performed relatively quickly according to the methods described herein because they can all be performed on a local database cache. If the local database cache is large enough to hold the entire database part associated with the processor set, the row insertion can occur without the need for remote locking, network traffic, etc.

Figure 5:
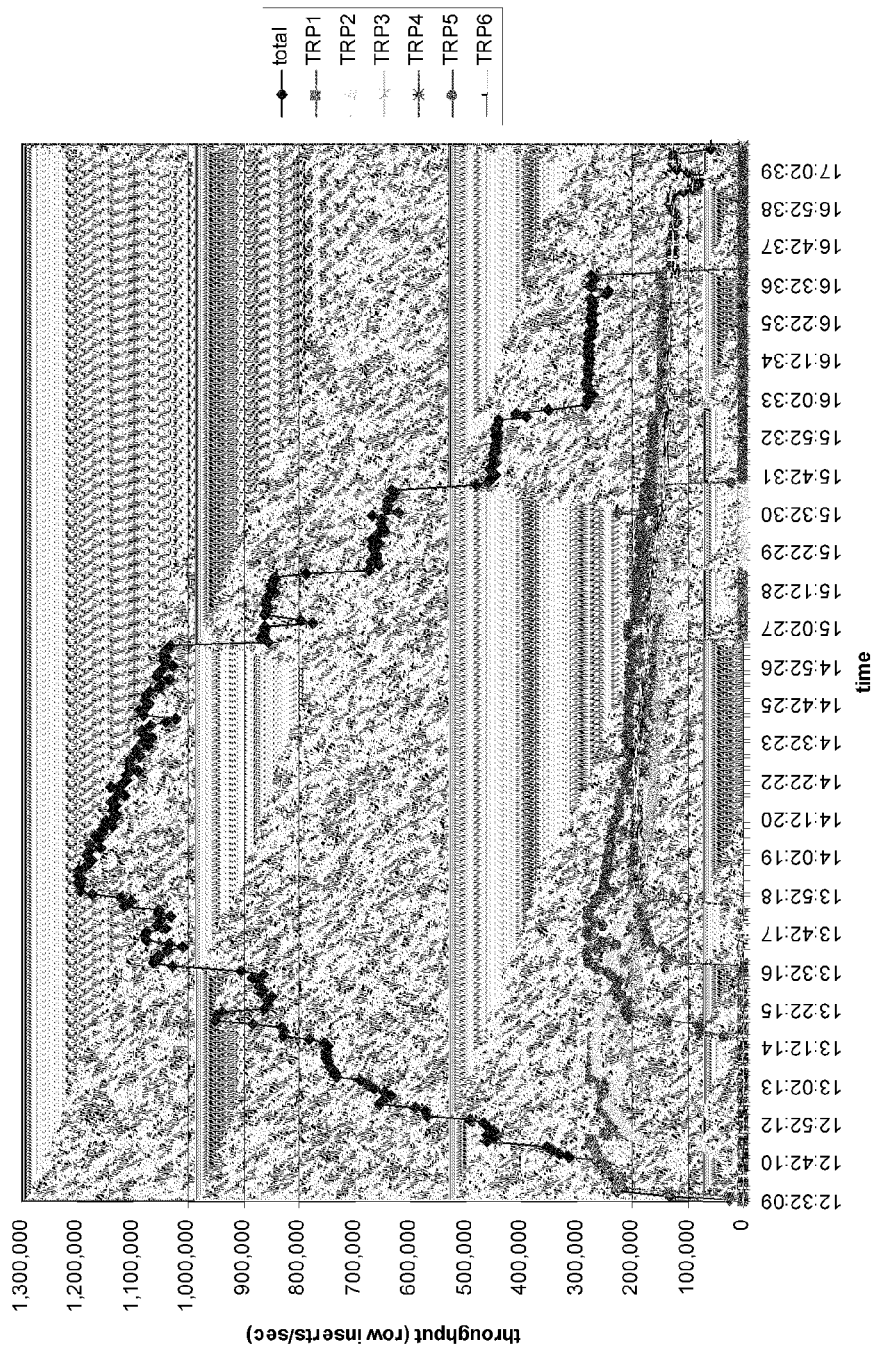
FIG. 5 is a graph showing data processing throughput according to another embodiment.

FIG. 5 is a graph showing the database row insertion throughput accomplished using an embodiment of the system and methods described above. Row insertions were performed using six processor sets with six database caches. The processor sets are labeled "TRP 1-6". Each processor set included four processors. Each processor set was also associated with three database insertion threads, each database insertion thread executing a process similar to that described above with respect to FIG. 4. In other words, three of the four processors in each processor set ran software performing an embodiment of the row insertion method described herein. One processor in each processor set ran a database logging thread.

As shown in FIG. 5, six lines represent the number of row insertions performed per second by each processor set TRP 1-6. An additional line labeled "total" represents the cumulative row insertions per second across all six processor sets TRP 1-6. As shown in the graph, the processor sets encountered a relatively small number of cache misses, which caused declines in the number of row insertions per second. For example, there is a dip in total row insertions per second around 15:02:27, 16:52:38, and 17:02:39. These dips likely represent times when the processor sets had to wait for network traffic, or hops across nodes causing multiples of local latency times, because required data was not present on the local node. For the most part however, the throughput on each processor set is smooth because the methods described herein substantially obviated the need to access remote data during a row insertion operation.

While the above processes and methods are described above as including certain steps and are described in a particular order, it should be recognized that these processes and methods may include additional steps or may omit some of the steps described. Further, each of the steps of the processes does not necessarily need to be performed in the order it is described.

While the above description has shown, described, and pointed out novel features of the invention as applied to various embodiments, it will be understood that various omissions, substitutions, and changes in the form and details of the system or process illustrated may be made by those skilled in the art without departing from the spirit of the invention. As will be recognized, the present invention may be embodied within a form that does not provide all of the features and benefits set forth herein, as some features may be used or practiced separately from others.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of processing records in a database on a plurality of processors grouped into a plurality of physically separate processor sets, the method comprising:
    associating, on at least one of the plurality of processors, each record with a record set of a plurality of record sets, based on a record number contained in the record;
    associating, on at least one of the plurality of processors, each record set with a processor set;
    electronically routing the records to processor sets based on the associated record set; and
    processing the records with the processor sets.

2. The method of claim 1, further comprising:
    creating a logging cache for each processor set of the plurality of processor sets or a single logging cache for the plurality of processors;
    creating an affinity between each logging cache and an associated processor set; and
    assigning a single processor in each processor set to log database transactions,
    wherein each processor set comprises a plurality of processors.

3. The method of claim 1, further comprising:
    creating a plurality of server processes, wherein each server process is associated with a processor set of the plurality of processor sets;
    creating an affinity between each server process and the associated processor set; and
    associating each server process with a record set,
    wherein each server process processes records in the associated record set.

4. The method of claim 1, further comprising:
    dividing the database into a plurality of sub-databases;
    associating each sub-database with a processor set; and
    creating a database cache for each sub-database associated with a processor set; and
    creating an affinity between each database cache and the associated processor set.

5. The method of claim 1, wherein routing records comprises routing records to processing sets based on a static routing table.

6. The method of claim 1, wherein associating records comprises associating records with record sets such that there is no data dependency between record sets when processing records.

7. An apparatus comprising a plurality of processors grouped into a plurality of physically separate processor sets configured to process records in a database, wherein the apparatus is configured to:
    associate each record with a record set of a plurality of record sets, based on a record number contained in the record;
    associate each record set with a processor set;
    electronically route the records to processor sets based on the associated record set; and
    process the records.

8. The apparatus of claim 7, wherein the apparatus is further configured to:
    create a logging cache for each processor set of the plurality of processor sets or a single logging cache for the plurality of processors;
    create an affinity between each logging cache and an associated processor set; and
    assign a single processor in each processor set to log database transactions,
    wherein each processor set comprises a plurality of processors.

9. The apparatus of claim 7, wherein the apparatus is further configured to:
    create a plurality of server processes, wherein each server process is associated with a processor set of the plurality of processor sets;
    create an affinity between each server process and the associated processor set; and
    associate each server process with a record set,
    wherein each server process processes records in the associated record set.

10. The apparatus of claim 7, wherein the apparatus is further configured to:
    divide the database into a plurality of sub-databases;
    associate each sub-database with a processor set; and
    create a database cache for each sub-database associated with a processor set; and
    create an affinity between each database cache and the associated processor set.

11. The apparatus of claim 7, wherein the apparatus is further configured to route records to processing sets based on a static routing table.

12. The apparatus of claim 7, wherein the apparatus is further configured to associate records with record sets such that there is no data dependency between record sets when processing records.

13. A computer-readable non-transitory storage medium comprising code capable of causing a computer to:
- associate each record in a database with a record set of a plurality of record sets, based on a record number contained in the record;
- associate each record set with a processor set;
- electronically route the records to physically separate processor sets based on the associated record set; and
- process the records.

14. The computer-readable non-transitory storage medium of claim 13, further comprising code capable of causing a computer to:
- create a logging cache for each processor set of the plurality of processor sets or a single logging cache for the plurality of processors;
- create an affinity between each logging cache and an associated processor set; and
- assign a single processor in each processor set to log database transactions,
- wherein each processor set comprises a plurality of processors.

15. The computer-readable non-transitory storage medium of claim 14, further comprising code capable of causing a computer to:
- create a plurality of server processes, wherein each server process is associated with a processor set of the plurality of processor sets;
- create an affinity between each server process and the associated processor set; and
- associate each server process with a record set,
- wherein each server process processes records in the associated record set.

16. The computer-readable non-transitory storage medium of claim 14, further comprising code capable of causing a computer to:
- divide the database into a plurality of sub-databases;
- associate each sub-database with a processor set; and
- create a database cache for each sub-database associated with a processor set; and
- create an affinity between each database cache and the associated processor set.

17. The computer-readable non-transitory storage medium of claim 14, further comprising code capable of causing a computer to route records to processing sets based on a static routing table.

18. The computer-readable non-transitory storage medium of claim 14, further comprising code capable of causing a computer to associate records with record sets such that there is no data dependency between record sets when processing records.

19. A method of inserting a record into a database in a multiprocessor environment, the method comprising:
- receiving, at a routing node, a record;
- associating, at the routing node, the record with a record set of a plurality of record sets, based on a record number contained in the record;
- electronically routing the record to a processor set of a plurality of physically separate processor sets based on the associated record set;
- searching, at the processor set, a part of the database for a matching record, the part of the database being associated with the processor set; and
- inserting the record into the part of the database when the record is not found in the part of the database.

20. An apparatus comprising a routing node and a plurality of processors grouped into a plurality of processor sets configured to process records in a database, wherein the apparatus is configured to:
- receive, at a routing node, a record;
- associate, at the routing node, the record with a record set of a plurality of record sets, based on a record number contained in the record;
- electronically route the record to a processor set of the plurality of physically separate processor sets based on the associated record set;
- search, at the processor set, a part of the database for a matching record, the part of the database being associated with the processor set; and
- insert, at the processor set, the record into the part of the database when the record is not found in the part of the database.

21. A computer-readable non-transitory storage medium comprising code capable of causing a computer to:
- receive, at a routing node, a record;
- associate, at the routing node, the record with a record set of a plurality of record sets, based on a record number contained in the record;
- electronically route the record to a processor set of a plurality of physically separate processor sets based on the associated record set;
- search, at the processor set, a part of the database for a matching record, the part of the database being associated with the processor set; and
- insert, at the processor set, the record into the part of the database when the record is not found in the part of the database.

22. A system for processing records in a database on a plurality of processors grouped into a plurality of physically separate processor sets, the system comprising:
- means for associating, on at least one of the plurality of processors, each record with a record set of a plurality of record sets, based on a record number contained in the record;
- means for associating, on at least one of the plurality of processors, each record set with a processor set;
- means for electronically routing the records to processor sets based on the associated record set; and
- means for processing the records with the processor sets.

23. The system of claim 22, further comprising:
- means for creating a logging cache for each processor set of the plurality of processor sets or a single logging cache for the plurality of processors;
- means for creating an affinity between each logging cache and an associated processor set; and
- means for assigning a single processor in each processor set to log database transactions,
- wherein each processor set comprises a plurality of processors.

24. The system of claim 22, further comprising:
- means for creating a plurality of server processes, wherein each server process is associated with a processor set of the plurality of processor sets;
- means for creating an affinity between each server process and the associated processor set; and
- means for associating each server process with a record set,
- wherein each server process processes records in the associated record set.

25. The system of claim 22, further comprising:
- means for dividing the database into a plurality of sub-databases;

means for associating each sub-database with a processor set; and means for creating a database cache for each sub-database associated with a processor set; and means for creating an affinity between each database cache and the associated processor set.

26. The system of claim 22, wherein means for routing records comprises means for routing records to processing sets based on a static routing table.

27. The system of claim 22, wherein means for associating records comprises means for associating records with record sets such that there is no data dependency between record sets when processing records.

\* \* \* \* \*